United States Patent
Wolf et al.

(10) Patent No.: US 7,207,157 B2
(45) Date of Patent: Apr. 24, 2007

(54) STACK SEALING METHOD USING MULTILAYER PACKAGING FILM

(75) Inventors: John R. Wolf, Greenville, SC (US); Ram K. Ramesh, Greenville, SC (US); George D. Wofford, Duncan, SC (US)

(73) Assignee: Cryovac, Inc., Duncan, SC (US)

( * ) Notice: Subject to any disclaimer, the term of this patent is extended or adjusted under 35 U.S.C. 154(b) by 691 days.

(21) Appl. No.: 09/843,990

(22) Filed: Apr. 27, 2001

(65) Prior Publication Data

US 2003/0012900 A1    Jan. 16, 2003

Related U.S. Application Data

(62) Division of application No. 09/034,410, filed on Mar. 4, 1998, now abandoned.

(51) Int. Cl.
*B65B 7/02*    (2006.01)

(52) U.S. Cl. .................. 53/469; 156/289; 156/308.4; 156/309.6; 428/34.9; 428/35.2; 428/35.7

(58) Field of Classification Search .............. 53/469, 53/447; 156/308.4, 309.6, 289; 428/34.9, 428/35.2, 35.7
See application file for complete search history.

(56) References Cited

U.S. PATENT DOCUMENTS

| | | | | |
|---|---|---|---|---|
| 3,919,033 A | * | 11/1975 | Gill et al. ................. | 156/283 |
| 3,958,391 A | * | 5/1976 | Kujubu ..................... | 53/434 |
| 4,064,296 A | | 12/1977 | Bornstein et al. .......... | 428/35 |
| 4,120,716 A | | 10/1978 | Bonet ....................... | 156/272 |
| 4,278,738 A | | 7/1981 | Brax et al. ............... | 428/515 |
| 4,429,079 A | | 1/1984 | Shibata et al. ............ | 525/240 |
| 4,469,742 A | | 9/1984 | Oberle et al. ............. | 428/215 |

(Continued)

FOREIGN PATENT DOCUMENTS

| | | |
|---|---|---|
| DE | 1636055 | 2/1971 |
| EP | 0 288 972 | 11/1988 |
| EP | 0 597 502 | 5/1994 |
| EP | 0 600 425 | 6/1994 |

(Continued)

OTHER PUBLICATIONS

ASTM d-882, "Standard Test Methods for Tensile Properties of Thin Plastic Sheeting", pp. 194-199, Nov. 15, 1991.

(Continued)

*Primary Examiner*—Stephen F. Gerrity
(74) *Attorney, Agent, or Firm*—Rupert B. Hurley, Jr.

(57) ABSTRACT

A heat-shrinkable multilayer film comprises (A) a first layer, which is an outer layer, and which comprises polyolefin; (B) a second layer comprising at least one member selected from the group consisting of polyolefin, polystyrene, and polyurethane, wherein the second layer has a thickness of from about 10 to 50 percent, based on a total film thickness; (C) a third layer comprising a polyamide having a melting point of 160° C. and below; and (D) a fourth layer, which is an outer layer, the fourth layer comprising polyester. The first layer preferably serves as a seal layer in a heat-shrinkable bag. The third layer provides enhanced orientability of the tape from which the film is formed, thereby providing improved total free shrink and lower shrink temperature. The third layer also provides greater optical clarity and permits the presence of a thicker polyamide layer, thereby increasing impact strength and improving the $O_2$-barrier of the film. The high melting polyester of the fourth layer permits at least two bags, having product therein, to be stacked on top of one another and sealed simultaneously, without sticking to one another, thereby doubling the output of a vacuum chamber machine. A bag and a process of making a packaged product are also disclosed.

12 Claims, 4 Drawing Sheets

U.S. PATENT DOCUMENTS

| | | | |
|---|---|---|---|
| 4,526,639 A * | 7/1985 | Reimann | 156/182 |
| 4,550,548 A * | 11/1985 | Owensby et al. | 53/434 |
| 4,631,901 A * | 12/1986 | Chung et al. | 53/455 |
| 4,654,240 A | 3/1987 | Johnston | 428/35 |
| 4,732,795 A | 3/1988 | Ohya et al. | 428/36 |
| 4,851,245 A | 7/1989 | Hisazumi et al. | 426/105 |
| 4,855,183 A | 8/1989 | Oberle | 428/345 |
| 4,879,124 A | 11/1989 | Oberle | 428/113 |
| 4,879,430 A | 11/1989 | Hoffman | 428/35.1 |
| 4,883,693 A | 11/1989 | Ohya et al. | 428/34.9 |
| 4,911,979 A | 3/1990 | Nishimoto et al. | 428/332 |
| 4,963,426 A | 10/1990 | Nishimoto et al. | 428/213 |
| 4,977,022 A | 12/1990 | Mueller | 428/349 |
| 5,002,782 A | 3/1991 | Oberle | 426/113 |
| 5,044,142 A | 9/1991 | Gianelli | 53/434 |
| 5,053,259 A | 10/1991 | Vicik | 428/36.91 |
| 5,068,136 A | 11/1991 | Yoshida et al. | 428/35.7 |
| 5,079,051 A | 1/1992 | Garland et al. | 428/34.9 |
| 5,082,743 A | 1/1992 | Itemura et al. | 428/520 |
| 5,086,924 A | 2/1992 | Oberle | 206/497 |
| 5,206,075 A | 4/1993 | Hodgson, Jr. | 428/216 |
| 5,213,900 A | 5/1993 | Friedrich | 428/474.4 |
| 5,241,031 A | 8/1993 | Mehta | 526/348.1 |
| 5,272,236 A | 12/1993 | Lai et al. | 526/348.5 |
| 5,278,272 A | 1/1994 | Lai et al. | 526/348.5 |
| 5,310,787 A | 5/1994 | Kutsuwa et al. | 524/513 |
| 5,336,549 A * | 8/1994 | Nishimoto et al. | 428/213 |
| 5,366,741 A * | 11/1994 | Van Der Zon | 426/79 |
| 5,419,726 A * | 5/1995 | Switlik et al. | 441/40 |
| 5,491,009 A | 2/1996 | Bekele | 428/35.7 |
| 5,524,418 A | 6/1996 | Thompson | 53/411 |
| 5,539,078 A | 7/1996 | Burkett et al. | 528/277 |
| 5,540,032 A * | 7/1996 | Sosnik et al. | 53/415 |
| 5,562,958 A | 10/1996 | Walton et al. | 428/34.9 |
| 5,594,092 A | 1/1997 | Burkett et al. | 528/272 |
| 5,604,043 A | 2/1997 | Ahlgren | 428/518 |
| 5,612,423 A | 3/1997 | Burkett et al. | 525/444 |
| 5,677,383 A | 10/1997 | Chum et al. | 525/240 |
| 5,845,463 A * | 12/1998 | Henaux | 53/450 |
| 5,874,139 A | 2/1999 | Bosiers et al. | 428/35.2 |
| 6,146,726 A | 11/2000 | Yoshi et al. | 428/35.9 |
| 6,282,869 B1 * | 9/2001 | Bullock et al. | 53/434 |
| 6,333,061 B1 * | 12/2001 | Vadhar | 428/34.9 |
| 2004/0065052 A1 * | 4/2004 | Ramesh et al. | 53/469 |

FOREIGN PATENT DOCUMENTS

| | | |
|---|---|---|
| EP | 0 707 957 | 4/1996 |
| EP | 0 476 836 | 11/1996 |
| GB | 2 067 131 | 7/1981 |
| JP | 55-3137 | 1/1980 |
| JP | 58-175658 A1 | 10/1983 |
| JP | 232948 | 11/1985 |
| JP | 1-247160 | 10/1989 |
| WO | 90/03414 | 4/1990 |
| WO | 93/03093 | 2/1993 |
| WO | 97/49293 | 12/1997 |

OTHER PUBLICATIONS

ASTM D-1003, "Standard Test Method for Haze and Luminous Transmittance f Transparent Plastics", pp. 197-201, Feb. 15, 1995.

ASTM D-1238, "Standard Test Method for Flow Rates of Thermoplastics by extrusion Plastometer", pp. 250-258, Nov. 10, 1995.

ASTM D-2457, "Standard Test Method for Specular Gloss of Plastic Films and Solid Plastics", pp. 11-15, Jan. 10, 1997.

ASTM D-2732, "Standrd Test Method for Unrestrained Linear Thermal Shrinkage of Plstic Film and Sheeting", pp. 368-371, Jul. 29, 1983.

ASTM D-2838, "Standard Test Method for Shrink Tension and Orientation Release Stress of Plastic Film and Thin Sheeting", pp. 119-122, Nov. 10, 1995.

ASTM D-3410, "Standard Test Method for Compressive Properties of Polymer Matrix Composite Compressive Properties of Polymer Matrix Composite Materials with Unsupported Gage Section by Shear Loading", pp. 1-16, Sep. 10, 1995.

ASTM D-3763, "Standard Test Method for High-Speed Puncture properties of Plastics Using Load and Displacement Sensors", pp. 174-178, Jul. 25, 1986.

Journal of Plastic Film and sheeting, "Optical Properties of Packaging Materials", Leroy Pike, vol. 9, Jul. 1993, pp. 173-181.

Journal of Polymer Science, "Determination of Branching Distributions in Polyethylene and Ethylene Copolymers", Wild et al, vol. 20, pp. 411-455 (1982).

* cited by examiner

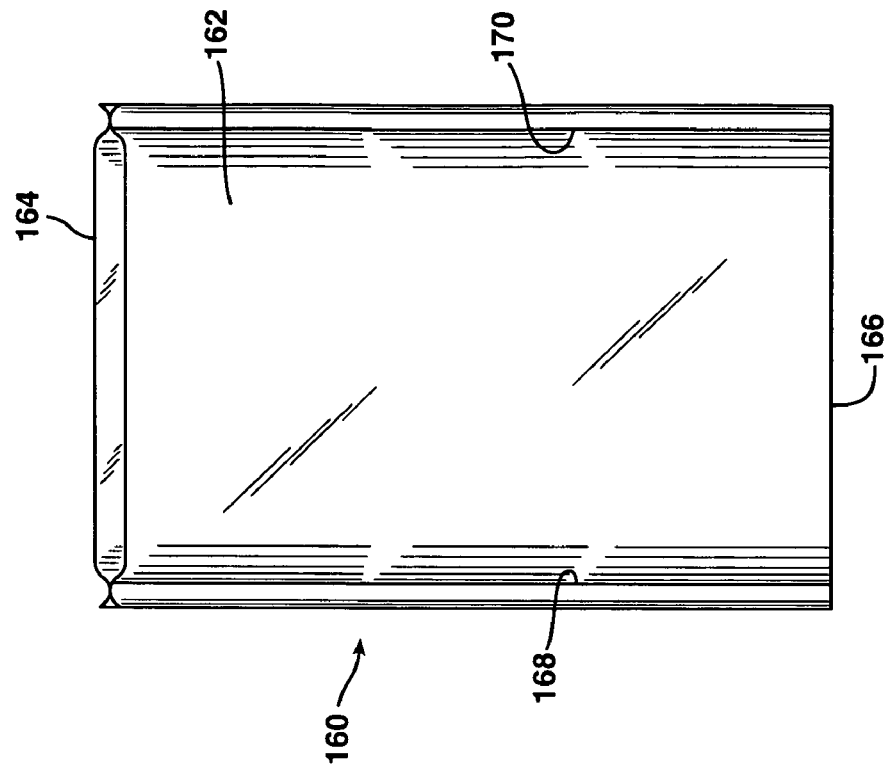
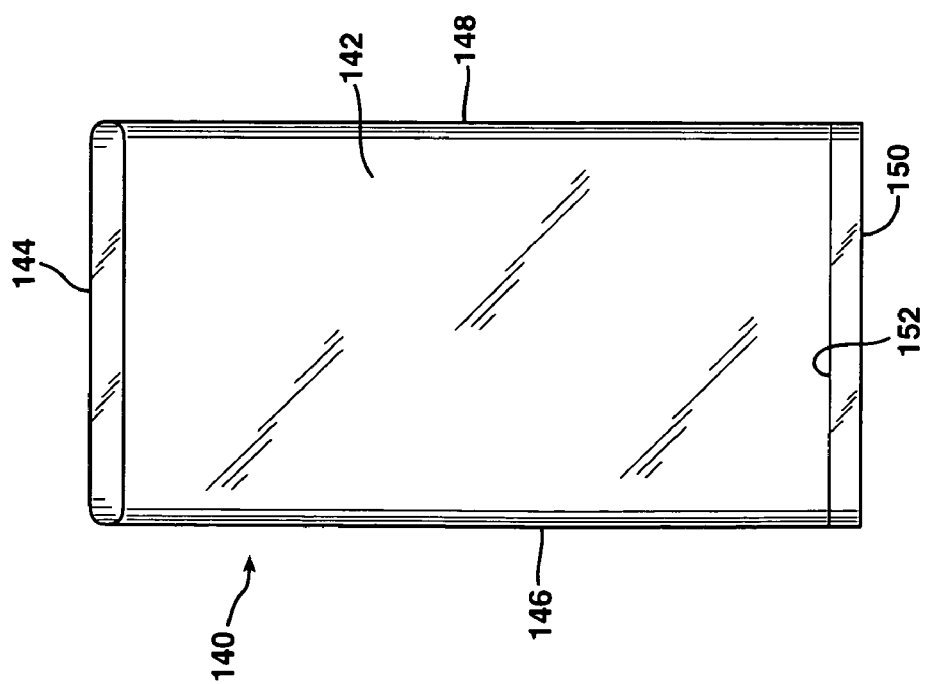

STACK SEALING METHOD USING MULTILAYER PACKAGING FILM

CROSS REFERENCE TO RELATED APPLICATION

This application is a division of U.S. patent application Ser. No. 09/034,410, filed Mar. 4,1998, now abandoned.

FIELD OF THE INVENTION

The present invention relates to heat-shrinkable films, especially multilayer, heat-shrinkable films suitable for use in the packaging of products. The present invention is also directed to a packaging method using such films.

BACKGROUND OF THE INVENTION

There is a need for multilayer heat-shrinkable films and articles of manufacture made therefrom, which have high impact strength, especially at elevated temperatures, high free shrink at 185° F., high modulus, high gloss and package presentation, good sealability and seal strength, and stack/overlap sealing capability, and which can be easily oriented. This combination of features is not currently available.

Recently it has been discovered that certain commercially available bags can be sealed when stacked on top of one another, i.e., without sticking to one another. This non-sticking characteristic provides an advantage for packaging in a vacuum chamber, because the chamber, although typically having only one sealing means, has more than enough space therewithin for multiple bagged products which are to be sealed after evacuation of the atmosphere from the chamber. Thus, the non-sticking feature enables the evacuation and sealing of more than one bag at a time in a vacuum chamber, thereby increasing the production rate of the vacuum chamber packaging apparatus.

U.S. Pat. No. 5,336,549, to Nishimoto et al., discloses a heat-shrinkable film which can be made into bags. Apparently, users of this film, which is commercially available, have discovered that bags made from the film can be stacked on top of one another during sealing, without sticking to one another (i.e., the bags are "stack-sealable"). This enables the output of vacuum chamber packaging machinery to be, for example, doubled, if two bags are stacked on top of one another and simultaneously sealed.

The film disclosed in the '549 patent has an outer layer of a polyester, and an intermediate layer of a polyamide having a melting point of higher than 160° C. and lower than 210° C. In addition, the '549 patent goes on to show that if the melting point of the polyamide is too low (e.g., 135° C. in Comparative Example 2), the variation in the load of the extruder was great and the stretchability of the film is unstable, resulting in a film having too much dimensional variation, and a thickness which was too lacking in uniformity. In Comparative Example 4, the '549 patent states that stretching was impossible if a polyamide having a melting point as high as 265° C. was used.

Although Nishimoto et al discloses a large group of polyamides for use in an inner layer, together with various polyesters for use in an outer layer, Nishimoto et al teaches that a polyamide having a melting point below 160° C., if used alone in the inner layer, results in a great variation in the load on the extruder, variation in the inflation initiating point, and shrinkage of at least 8% during storage at room temperature. Nishimoto et al does disclose a film using a blend of a high melting polyamide and a low melting polyamide, but the blend contained only 30% of the low melting polyamide.

SUMMARY OF THE INVENTION

We have discovered that a heat-shrinkable film having an outer polyester layer can be made without an inner layer containing a polyamide having a melting point more than 160° C. and less than 210° C. More particularly, we have discovered that we can produce a film having an outer polyester layer and an inner layer of polyamide having a melting point within the temperature range of 160° C. and below, while obtaining a film of relatively uniform thickness, relatively uniform dimensions, and with a relatively uniform load on the extruder. Our film can also be converted to bags a plurality of which can be stacked and sealed simultaneously.

Moreover, we have discovered a variety of advantages in our film, relative to the film of the '549 patent. That is, our film, which has a lower melting polyamide than the polyamide of the '549 patent, exhibits improved heat-shrinkability over the film of the '549 patent, in that it can be oriented at a lower temperature, thereby providing our film with the ability to shrink at a lower temperature. This is most advantageous in the packaging of heat-sensitive products, such as food products, especially fresh meat products, which can be scorched or otherwise discolored by exposure to heat utilized to shrink the film tightly against the meat. Moreover, because the orientation can be carried out at a lower temperature, the orientation step becomes easier in that the tape which is to be oriented can more easily be heated to the desired orientation temperature.

Our film is also easier to produce because our polyamide extrusion temperature is lower than for a polyamide having a higher melting temperature of from 160° C. to 210° C. The reduced extrusion temperature provides greater chemical stability, i.e., lower chemical degradation, not only of the polyamide, but also of the more temperature-sensitive polymers in other layers, which is typically coextruded in a layer which is in direct contact with, or close to, the layer of polyamide. Heat from the extruded polyamide can affect the stability of polymer in such adjoining and nearby layers, especially layers containing ethylene-based polymer.

The use of a polyamide with a melting point within the temperature range of from 160° C. and below provides certain unexpected results when compared to the use of polyamides with melting points greater than 160° C. It has been discovered that in the multilayer film of the invention, the use of an inner layer comprising a polyamide with a melting point of 160° C. and below, in conjunction with an outer layer comprising polyester: enables the film to be oriented to a higher degree than would be permitted with if the polyamide has a melting point greater than 160° C.; produces a film with a higher level of free shrink than can be obtained if the polyamide has a melting point greater than 160° C.; and, provides superior optical clarity, relative to films having an inner layer comprising a polyamide with a melting point of greater than 160° C. Furthermore, it has also been discovered that the films of this invention are: easier to orient when compared to prior art films, especially those comprising an outer polyester layer and an inner layer comprising a polyamide with melting point greater than 160° C. The ease of orientability and wider orientation window provided the films of this invention also result in a more stable orientation process. Additionally, the films of this invention can also be made by orienting a tape at a lower temperature, relative to the orientation step for a tape containing polyamide having a melting point greater than 160° C. While the composition of the films of this invention also provide higher free shrink, the process of orientation at a lower temperature also enhances the free shrink of the multilayer films of this invention. Furthermore, the films of this invention are relatively free of optical defects (such as die-lines), versus films comprising an outer polyester layer and an inner layer comprising a polyamide with a melting point greater than 160° C.

Furthermore, in the packaging of a relatively rigid product which is not distorted by forces produced by a shrinking film, it is generally desirable to provide a heat-shrinkable packaging film with as high a free-shrink as possible, in order to provide the "tightest" possible packaging over the product. In general, a tighter package provides a superior appearance, all other factors remaining the same. Our film has a relatively high free shrink, thereby enabling improved product appearance over a film having a lower free shrink.

As a first aspect, the present invention is directed to a heat-shrinkable multilayer film comprising: (A) a first layer, which is an outer layer, and which comprises polyolefin; (B) a second layer comprising at least one member selected from the group consisting of polyolefin, polystyrene, and polyurethane, the second layer having a thickness of from about 10 to about 50 percent, based on total film thickness; (C) a third layer comprising polyamide having a melting point of 160° C. and below; and (D) a fourth layer, which is an outer layer, the fourth layer comprising polyester. Preferably, the second layer has a thickness of from about 13 to about 45 percent on a total film thickness basis; more preferably, from about 15 to about 40 percent; still more preferably, from about 17 to about 35 percent; yet still more preferably, from about 19 to about 27 percent. Preferably, the polyamide makes up at least 40 percent of the weight of the layer.

Preferably, the film has a total free shrink, at 185° F., of from about 40 to about 170 percent; more preferably, from about 50 to about 160 percent; still more preferably, from about 50 to about 160 percent; still more preferably, from about 60 to about 150 percent; still more preferably, from about 60 to about 120 percent; and, still more preferably, from about 70 to about 110 percent.

Preferably, the film has a thickness uniformity of at least 20 percent; more preferably, at least 30 percent; still more preferably, at least 40 percent; yet still more preferably, at least 50 percent; even yet still more preferably, at least 60 percent; still more preferably, at least 70 percent; still more preferably, at least 80 percent; and, still more preferably, at least 85 percent.

The fourth layer comprises a polyester having a melting point of from about 200 to about 260° C.; more preferably, from about 210 to about 240° C.; still more preferably, from about 220 to about 235° C. Preferably, the polyester in the fourth layer comprises from about 70 to about 95 mole percent terephthalate mer units; more preferably, from about 80 to about 95 mole percent terephthalate mer units; still more preferably, from about 85 to about 90 mole percent terephthalate mer units.

Preferably, the film has a gloss of at least 50 percent, as measured against the fourth layer by ASTM D 2457 (hereby incorporated in its entirety, by reference thereto); more preferably, the gloss is at least about 55 percent; more preferably, at least about 60 percent; more preferably, at least about 65 percent; more preferably, at least about 70 percent; and still more preferably, at least about 75%. Preferably, the film has a haze of no more than 10 percent, as measured by ASTM D 1003 (hereby incorporated, in its entirety, by reference thereto); more preferably, a haze of from about 0 to about 7 percent; still more preferably, from about 0 to about 5 percent.

Preferably, the film has a total thickness of from about 0.5 to about 10 mils; more preferably, from about 1 to about 5 mils; more preferably, from about 1.3 to about 4 mils; still more preferably, from about 1.5 to about 3.5; yet still more preferably, from about 1.8 to about 2.5.

Preferably, the film further comprises a fifth layer which serves as an $O_2$-barrier layer, the fifth layer comprising at least one member selected from the group consisting of EVOH, PVDC, polyalkylene carbonate, polyamide, and polyethylene naphthalate. Preferably, the fifth layer is between the third layer and the fourth layer.

Preferably, the film further comprises a sixth layer which comprises a polyamide having a melting point below 160° C., wherein the sixth layer is between the fourth layer and the fifth layer. Preferably, the film further comprises a seventh layer which is a tie layer, the seventh layer being between the second layer and the third layer, and an eighth layer which is also a tie layer, the eighth layer being between the fourth layer and the sixth layer.

Preferably, the first layer comprises ethylene/alpha-olefin copolymer, the second layer comprises ethylene/vinyl acetate copolymer, the third layer comprises polyamide having a melting point below 140° C., the fourth layer comprises polyethylene terephthalate; and the fifth layer comprises EVOH. More preferably, the first layer comprises a blend of homogeneous ethylene/alpha-olefin copolymer and heterogeneous ethylene/alpha-olefin copolymer, and the third layer comprises a copolymer of caprolactam and laurylactam.

Preferably, the second layer is between the first layer and the third layer; the third layer is between the second layer and the fifth layer; the fifth layer is between the third layer and the fourth layer, with the first and fourth layers being outer layers.

Preferably, the first layer has a thickness of from about 1 to about 40 percent (more preferably, from about 20 to about 30 percent), based on total film thickness; the second layer has a thickness of from about 10 to about 40 percent (more preferably, from about 10 to about 25 percent), based on total film thickness; the third layer has a thickness of from about 5 to about 40 percent (more preferably, from about 18 to about 25 percent), based on total film thickness; the fourth layer has a thickness of from about 1 to about 25 percent (more preferably, from about 4 to about 16 percent), based on total film thickness; the fifth layer has a thickness of from about 1 to about 20 percent, based on total film thickness (more preferably, from about 5 to about 15 percent).

Preferably, the film comprises a crosslinked polymer network. It is especially preferred that the second layer comprises a crosslinked network comprising ethylene/vinyl acetate copolymer.

Preferably, the film has an impact strength (at peak load, at room temperature), as measured by ASTM D-3763 (hereby incorporated by reference thereto, in its entirety), of at least about 60 Newtons (N); more preferably, from about 60 to about 500 N; yet more preferably, from about 70 to about 500 N; yet still more preferably, from about 80 to about 500 N; more preferably, from about 90 to about 500 N; more preferably, from about 100 to about 500 N; more preferably, from about 110 to about 500 N; more preferably, from about 120 to about 500 N.

Preferably, the film has an impact strength (peak load) at 190° F. (88° C.), as measured by ASTM D3763 conducted at 190° F. (88° C.), of at least about 10 pounds (i.e., lbf or poundfouce); more preferably, from about 10 to about 150 pounds; still more preferably, from about 15 to about 100 pounds; yet still more preferably, from about 18 to about 75 pounds; still more preferably, from about 20 to about 60 pounds; and, still more preferably, from about 25 to about 50 pounds.

As a second aspect, the present invention pertains to a bag made from the film according to the first aspect of the present invention. Preferably, the bag is made from a preferred film according to the first aspect of the present invention. Preferably, the bag is produced by sealing the first layer to itself, whereby the first layer is an inside bag layer and the fourth layer is an outside bag layer. Preferably, the bag is made from a preferred film according to the first aspect of the present invention. The bag can be an end-seal bag, a side-seal bag, an L-seal bag (i.e., sealed across the bottom and along one side, with an open top), or a pouch (i.e., sealed on three sides, with an open top).

As a third aspect, the present invention is directed to a process for packaging a product, comprising the steps of (A) placing a first product into a flexible, heat-shrinkable bag which is in accordance with the second aspect of the present invention; (B) repeating the placing step with a second product and a second bag, whereby a second bagged product results; (C) stacking at least the first and second bagged products so that an excess bag length of each of the bagged products are within a sealing range of a means for heat-sealing; and (D) heat-sealing the inside layer of first bag to itself in the region between the open end of the first bag and the first product, and the inside layer of the second bag to itself in the region between the open end of the second bag and the second product, so that the first product is completely sealed within the first bag and the second product is completely sealed within the second bag. The sealing is carried out at a temperature so that the resulting packaged products can be freely separated from one another without layer delamination. The bag has an open top so that prior to sealing, both the first bagged product and the second bagged product have excess bag length. During sealing of each bag, the first layer is sealed to itself, as the first layer is the inside layer in both the first bag and the second bag. Likewise, the fourth layer is the outside layer of the first bag and the second bag. The process can be carried out in a continuous, single, dual, or rotary chamber vacuum packaging machine. Preferably, from 2 to 5 bagged products are stacked on top of one another during heat-sealing. Preferably, the process utilizes a preferred bag in accordance with the present invention.

BRIEF DESCRIPTION OF THE DRAWINGS

FIG. 3 illustrates a schematic of an end-seal bag in accordance with the present invention, in lay-flat view.

FIG. 4 illustrates a schematic of a side-seal bag in accordance with the present invention, in lay-flat view.

DETAILED DESCRIPTION OF THE INVENTION

Figure 1:
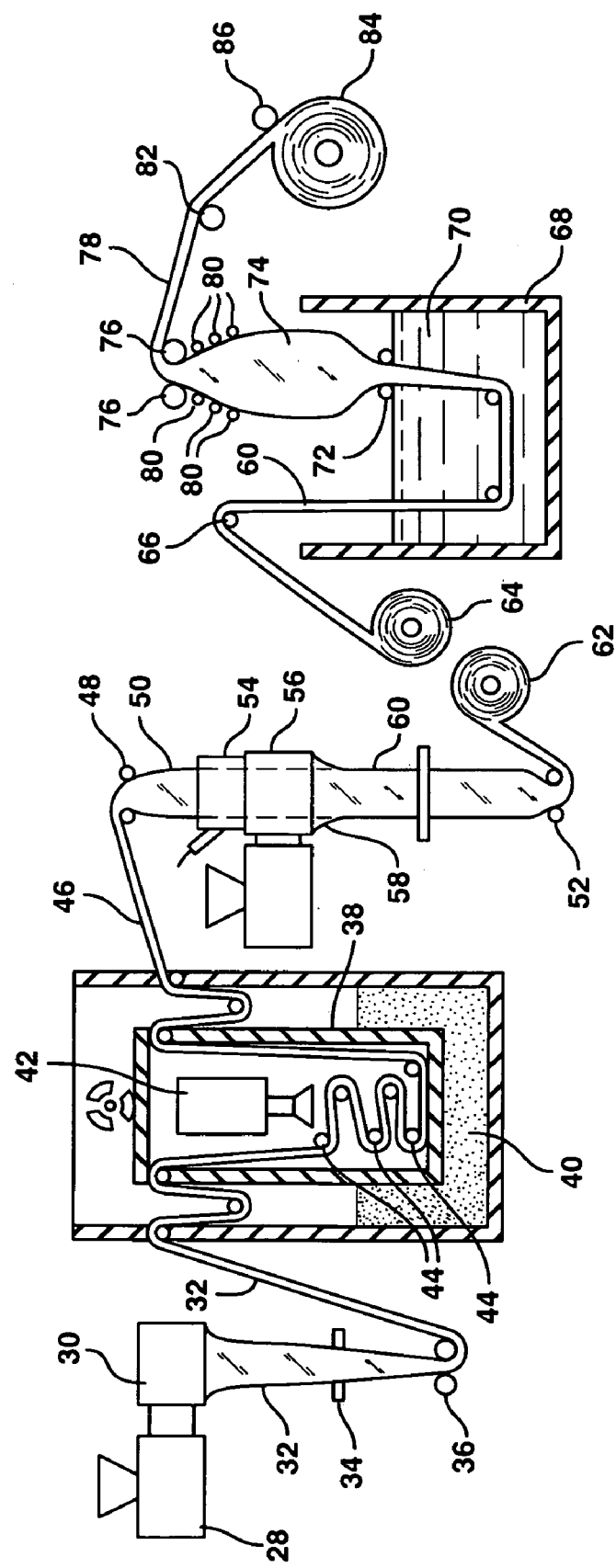
FIG. 1 illustrates a schematic view of a first preferred process for making a multilayer film in accordance with the present invention.

As used herein, the phrase "free shrink" refers to the percent dimensional change in a 10 cm×10 cm specimen of film, when subjected to selected heat (i.e., at a certain temperature), with the quantitative determination being carried out according to ASTM D 2732, as set forth in the 1990 *Annual Book of ASTM Standards*, Vol. 08.02, pp.368–371, which is hereby incorporated, in its entirety, by reference thereto.

The multilayer film according to the present invention preferably has a total free shrink of at least 40 percent at 185° F. "Total free shrink" is determined by summing the percent free shrink in the machine direction with the percentage of free shrink in the transverse direction. For example, a film which exhibits, at 185° F., 50% free shrink in the transverse direction and 40% free shrink in the machine direction, has a "total free shrink" at 185° F. of 90%. It should be noted, however, the film does not have to have shrinkage in both directions. Unless specified otherwise, the phrase "free shrink", as used herein, refers to total free shrink. Preferably, the multilayer film of the present invention has a free shrink at 185° F. of from 40 to about 170 percent; more preferably, from about 50 to about 160 percent; still more preferably, from about 60 to about 140 percent; yet still more preferably, from about 70 to about 130 percent; still more preferably, from about 75 to about 125 percent; still more preferably, from about 80 to about 120 percent; still more preferably, from about 85 to about 115 percent; and, still more preferably, from about 90 to about 110 percent.

Preferably, the film has a gloss of at least 60% (preferably, from about 60 to about 90%); more preferably, at least 70% (preferably, from about 70 to about 90%); still more preferably, at least 80% (preferably, from about 80 to about 90%).

The percent haze of a film is determined by subjecting the film to analysis by ASTM D 1003. This method is described in detail in 1990 *Annual Book of ASTM Standards*, Section 8, Vol. 08.01, ASTM D 1003, "Standard Test Method for Haze and Luminous Transmittance of Transparent Plastics", pp. 358–363, which is hereby incorporated by reference thereto, in its entirety. Haze results were obtained using an XL 211 HAZEGARD (TM) SYSTEM, obtained from the Gardner/Neotec Instrument Division, of Silver Spring, Md. This instrument requires a minimum sample size of about 1 square inch. Preferably, the film of the instant invention has a haze of less than 10 percent (preferably, from 0 to about 9 percent; more preferably, from about 1 to about 8 percent; more preferably, from about 2 to about 7 percent; still more preferably, from about 2 to about 6; yet still more preferably, from about 2 to about 5 percent; and yet still more preferably, from about 2 to about 4 percent).

Haze is a measurement of the transmitted light scattered more than 2.5° from the axis of the incident light. It is measured with a meter similar to a total light transmission meter, with the exception that it contains a light trap to absorb light scattered less than 2.5° and regular transmitted light. It is common to measure the total transmitted light first by defeating the light trap and then setting the meter to 100. Then the light trap is allowed to absorb the light scattered less than 2.5° (plus regular transmitted light), and haze is read as a percentage of total transmitted light. Note thatthe denominator here is total transmitted light ($I_s+I_r$), not incident light ($I_t$), as in the measurement of total transmitted light.

The measurement of optical properties of plastic films used in packaging, including the measurement of total transmission, haze, clarity (i.e., total transmission) and gloss, is discussed in detail in Pike, LeRoy, "Optical Properties of Packaging Materials", *Journal of Plastic film & sheeting*, Vol. 9, No. 3, pp. 173–180 (July 1993), which is hereby incorporated by reference thereto, in its entirety.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the phrases "seal layer", "sealing layer", "heat seal layer", and "sealant layer", refer to an outer layer, or layers, involved in the sealing of the film to itself, another layer of the same or another film, and/or another article which is not a film. Although it should also be recognized that in general, up to the outer 3 mils of a film can be involved in the sealing of the film to itself or another layer, the phrase "seal layer," and the like, refer herein only to the outer layer(s) which is to be heat-sealed to itself, another film, etc. Any inner layers which contribute to the sealing performance of the film are herein designated as "seal-assist" layers. With respect to packages having only fin-type seals, as opposed to lap-type seals, the phrase "sealant layer" generally refers to the inside layer of a package, the inside layer being an outer layer which frequently also serves as a food contact layer in the packaging of foods. However, in a multilayer film, the composition of the other layers (within 3 mils of the inside surface) can also affect sealability and seal strength.

In general, sealant layers employed in the packaging art have included the genus of thermoplastic polymer, which includes thermoplastic polyolefin, polyamide, polyester, polyvinyl chloride, and ionomer. Preferred polymers for the sealant layer include homogeneous ethylene/alpha-olefin copolymer, ethylene/vinyl acetate copolymer, and ionomer.

As used herein, the term "heat-seal," and the phrase "heat-sealing," refer to any seal of a first region of a film surface to a second region of a film surface, wherein the seal is formed by heating the regions to at least their respective seal initiation temperatures. The heating can be performed by any one or more of a wide variety of manners, such as using a heated bar, hot wire, hot air, infrared radiation, ultrasonic sealing, etc. Heat-sealing is the process of joining two or more thermoplastic films or sheets by heating areas in contact with each other to the temperature at which fusion occurs, usually aided by pressure. Heat-sealing is inclusive of thermal sealing, melt-bead sealing, impulse sealing, dielectric sealing, and ultrasonic sealing.

As used herein, the term "barrier," and the phrase "barrier layer," as applied to films and/or layers, is used with reference to the ability of a film or layer to serve as a barrier to one or more gases. In the packaging art, oxygen (i.e., gaseous $O_2$) barrier layers have, in general, included, for example, ethylene/vinyl alcohol copolymer, polyvinylidene chloride (PVDC), polyalkylene carbonate, polyanide, polyethylene naphthalate, polyester, polyacrylonitrile, etc., as known to those of skill in the art. However, in the present invention the $O_2$-barrier layer preferably comprises either EVOH or polyvinylidene chloride, the PVDC comprising a thermal stabilizer (i.e., HCl scavenger, e.g., epoxidized soybean oil) and a lubricating processing aid, which, for example, comprises one or more acrylates.

As used herein, the phrases "abuse layer", as well as the phrase "puncture-resistant layer", refer to any layer which serves to resist abrasion, puncture, and other potential causes of reduction of package integrity, as well as potential causes of reduction of package appearance quality. As used herein, the phrase "skin layer" refers to an outside layer of a multilayer film in packaging a product, this skin layer being subject to abuse.

As used herein, the term "core", and the phrase "core layer", as applied to multilayer films, refer to any internal layer which preferably has a function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "tie layer" refers to any internal layer having the primary purpose of adhering two layers to one another. In one preferred embodiment, tie layers can comprise any polymer having a polar group grafted thereon, so that the polymer is capable of covalent bonding to polar polymers such as polyamide and ethylene/vinyl alcohol copolymer. Preferred polymers for use in tie layers include, but are not restricted to, ethylene/unsaturated acid copolymer, ethylene/unsaturated ester copolymer, anhydride-grafted polyolefin, polyurethane, and mixtures thereof.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film.

As used herein, the phrases "food-contact layer" and "meat-contact layer", refer to a layer of a multilayer film which is in direct contact with the food/meat in the package comprising the film. The food-contact/meat-contact layer is an outer layer of the multilayer film, in the sense that the food-contact/meat-contact layer is in direct contact with the meat product within the package. The food-contact/meat-contact layer is an inside layer in the sense that with respect to the packaged food product/meat product, the food-contact/meat-contact layer is the inside layer (i.e., innermost layer) of the package, this inside layer being in direct contact with the food/meat.

As used herein, the phrase "food-contact surface" and "meat-contact surface" refers to an outer surface of a food-contact layer/meat-contact layer, this outer surface being in direct contact with the food/meat within the package.

As used herein, the phrase "thickness uniformity" refers to percent value obtained by measuring the maximum and minimum thickness of the film and applying these numbers to the following formula:

$$\text{Thickness Uniformity}(\%) = 100 - \frac{\text{film thickness}_{(max)} - \text{film thickness}_{(min)}}{\text{film thickness}_{(max)}} \times 100.$$

The maximum and minimum thicknesses are determined by taking a total of 10 thickness measurements at regular distance intervals along the entirety of the transverse direction of a film sample, recording the highest and lowest thickness values as the maximum and minimum thickness values, respectively, and computing the thickness uniformity (a percent value) using the formula above. A thickness uniformity of 100% represents a film of absolute thickness uniformity, i.e., no measurable differences in thickness; in contrast, a film in which the film thickness(min) is measured at 45% of the film thickness(max) has a thickness uniformity of only 45%.

As used herein, "EVOH" refers to ethylene/vinyl alcohol copolymer, i.e., polymerized ethylene vinyl alcohol. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50%, and more preferably, at least 85%. Preferably, the EVOH comprises from about 28 to about 48 mole % ethylene, more preferably, from about 32 to about 44 mole % ethylene, and even more preferably, from about 38 to about 44 mole % ethylene.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another, Expansion in the machine direction is herein referred to as "drawing", whereas expansion in the transverse direction is herein referred to as "stretching". For films extruded through an annular die, stretching is usually /////obtained by "blowing" the film to produce a bubble. For such films, drawing is usually obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred teas the orientation ratio, or sometimes as the "racking ratio".

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrases "heat-shrinkable," "heat-shrink," and the like, refer to the tendency of a film, generally an oriented film, to shrink upon the application of heat, i.e., to contract upon being heated, such that the size (area) of the film decreases while the film is in an unrestrained state. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained). Preferably, the heat-shrinkable film has a total free shrink (i.e., machine direction plus transverse direction), as measured by ASTM D 2732, of at least as 5 percent at 185° C., more preferably at least 7 percent, still more preferably, at least 10 percent, and, yet still more preferably, at least 20 percent.

The multilayer films of the invention can be annealed or heat-set to reduce the free shrink either slightly, substantially or completely.

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist of a single polymer (with or without non-polymeric additives), or can have still additional polymers together therewith, i.e., blended therewith.

As used herein, the term "homopolymer" is used with reference to a polymer resulting from the polymerization of a single monomer, i.e., a polymer consisting essentially of a single type of mer, i.e., repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene. The term copolymer is also inclusive of polymers produced by reaction, such as graft copolymer, block copolymer, and random copolymer.

As used herein, the term "polymerization" is inclusive of homopolymerizations, copolymerizations, terpolymerizations, etc., and includes all types of copolymerizations such as random, graft, block, etc. In general, the polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers to result in a copolymer. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

For addition polymers, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mers" derived from the monomers from which the copolymer is produced, e.g., a propylene/ethylene copolymer comprises propylene mer units and ethylene mer units.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (TM) linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally have ($M_w/M_n$) of less than 2.7; preferably from about 1.9 to about 2.5; more preferably, from about 1.9 to about 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to about 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to about 105° C. Preferably the homogeneous copolymer has a DSC peak $T_m$ of from about 80° C. to about 100° C. As used herein, the phrase "essentially single melting point" means that at least about 80%, by weight, of the material corresponds to a single $T_m$ peak at a temperature within the range of from about 60° C. to about 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefins. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/unsaturated ester copolymer, ethylene/unsaturated acid copolymer, (especially ethyl acrylate copolymer, ethylene/butyl acrylate copolymer, ethylene/methyl acrylate copolymer, ethylene/acrylic acid copolymer, ethylene/methacrylic acid copolymer), modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed EXACT (TM) linear homogeneous ethylene/alpha olefin copolymer resins obtainable from the Exxon Chemical Company, of Baytown, Tex., and TAFMER (TM) linear homogeneous ethylene/alpha-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY (TM) resins, are also included as another type of homogeneous ethylene/alpha-olefin copolymer useful in the present invention.

In general, the ethylene/alpha-olefin copolymer comprises a copolymer resulting from the copolymerization of from about 80 to about 99 weight percent ethylene and from 1 to about 20 weight percent alpha-olefin. Preferably, the ethylene/alpha-olefin copolymer comprises a copolymer resulting from the copolymerization of from about 85 to about 95 weight percent ethylene and from about 5 to about 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. The phrase "outside layer" also is used with reference to the outermost layer of a plurality of concentrically arranged layers coextruded through an annular die.

As used herein, the term "adhered" is inclusive of films which are directly adhered to one another using a heat-seal or other means, as well as films which are adhered to one another using an adhesive which is between the two films. As used herein, the phrase "directly adhered", as applied to layers, is defined as adhesion of the subject layer to the object layer, without a tie layer, adhesive, or other layer therebetween. In contrast, as used herein, the word "between", as applied to a layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

At least a portion of the multilayer film of the present invention is preferably irradiated to induce crosslinking. In the irradiation process, the film is subjected to one or more energetic radiation treatments, such as corona discharge, plasma, flame, ultraviolet, X-ray, gamma ray, beta ray, and high energy electron treatment, each of which induces cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons is employed, preferably using an electron accelerator, with a dosage level being determined by standard dosimetry methods. Other accelerators such as a Van de Graaf or resonating transformer may be used. The radiation is not limited to electrons from an accelerator since any ionizing radiation may be used. The ionizing radiation can be used to crosslink the polymers in the film. Preferably, the film is irradiated at a level of from about 30 kGy to about 207 kGy, more preferably from about 30 kGy to about 140 kGy. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto. BONET discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material. The films of this invention can be corona-treated in a preferred embodiment.

Preferably, the film according to the present invention comprises a total of from 4 to 20 layers; more preferably, from 4 to 12 layers; and still more preferably, from 5 to 9 layers. The multilayer film of the present invention can have any total thickness desired, so long as the film provides the desired properties for the particular packaging operation in which the film is used, e.g. optics, modulus, seal strength, etc.

The multilayer film according to the present invention comprises 4 layers. The first layer comprises at least one polyolefin; more preferably, at least one member selected from the group consisting of polyethylene homopolymer, polyethylene copolymer, polypropylene homopolymer, polypropylene copolymer, polybutene homopolymer, polybutene copolymer; and even more preferably at least one member selected from the group consisting of ethylene/alpha-olefin copolymer, ethylene/unsaturated ester copolymer, and ethylene/unsaturated acid copolymer. More preferably, the first layer comprises homogeneous ethylene/alpha-olefin copolymer. Preferably, the ethylene/alpha-olefin copolymer has a density of less than 0.930 g/cc (preferably, from about 0.86 to less than 0.930, more preferably, from about 0.880 to less than 0.930), more preferably, less than 0.920, more preferably, less than 0.915, more preferably, less than 0.910, more preferably less than 0.905, more preferably, less than 0.903, more preferably, less than 0.900, more preferably, less than 0.898. In general, for the films of the invention, the lower the density of the polyolefin in the seal layer, the better the sealability and resistance to burn-through.

Preferably, the polyolefin in the first layer has a melting point less than 125° C. (more preferably, from about 50° C. to less than 125° C.; still more preferably, from about 70 to less than about 125° C.); more preferably, less than 120° C.; more preferably, less than 115° C.; more preferably, less than 110° C.; more preferably, less than 108° C.; more preferably, less than 105° C. more preferably, less than 100° C.; more preferably, less than 97° C.; more preferably less than 95° C.; more preferably, less than 93° C., more preferably, less than 90° C.

The first layer can further comprise additional polymer in an amount of from about 5 to about 80 percent, based on layer weight, more preferably from about 10 to about 40% and even more preferably, from about 10 to about 20%. Preferred additional polymers include at least one member selected from the group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer.

In one preferred embodiment, the first layer comprises a blend of a homogeneous ethylene-alpha olefin copolymer with a heterogeneous ethylene alpha-olefin copolymer. Preferably, the homogeneous ethylene-alpha olefin copolymer has a density less than about 0.910 g/cc (preferably, from about 0.86 to less than about 0.910; more preferably, from about 0.88 to less than about 0.910) and the heterogeneous ethylene-alpha olefin copolymer has a density greater than about 0.910.

Preferably, the polyolefin of the first layer has a melt index of from about 0.3 to about 50 g/10 min; more preferably from about 1 to about 20; still more preferably from about 2 to about 10, even more preferably from about 3 to about 8; and, still more preferably from about 4 to about 6 (as measured by ASTM D1238, hereby incorporated, in its entirety, by reference thereto).

Preferably, the first layer has a thickness of from about 0.1 to about 4 mils; more preferably, from about 0.2 to about 1 mil; and, still more preferably, from about 0.3 to about 0.8 mils. Preferably, the thickness of the first layer is from about 1 to about 60 percent of the total thickness of the multilayer film; more preferably, about 5 to about 50%; still more preferably, about 10 to about 40%; more preferably, from about 15 to about 35%; and, even more preferably, about 20 to about 30%. Preferably, the thickness of the first layer is at least 50% of the thickness of the third layer; more preferably, at least 75% of the thickness of the third layer; more preferably, at least 100% of the thickness of the third layer, more preferably, at least 125% of the thickness of the third layer; and, even more preferably, at least 150% of the thickness of the third layer.

In the first layer, the use of a polyolefin with a low melting point (preferably, less than 120° C. {more preferably, from about 50° C. to less than 120° C.; still more preferably, from about 70 to less than 120° C.}; more preferably, less than about 110° C., e.g., homogeneous ethylene/alpha-olefin copolymers) provides the advantage of ease of sealability of the film, and resistance to burn-through of the film. It is believed that these advantages are realized because the use of a lower melting polyolefin in the seal layer permits the use of a lower sealing temperature and widens the sealing window, thereby reducing the tendency to burn through. Furthermore, the use of a lower sealing temperature enhances the use of this film for applications involving stack/overlap sealing. In addition, the use of a polyolefin with a low melting point, in combination with a layer comprising a polyamide with a melting point of 160° C. and below, provides the article of manufacture made therefrom with high seal strength. The use of the preferred polyolefins as described for the first layer also enables the film of the invention to be oriented more easily and provide the multilayer film with high free shrink and excellent optics.

The second layer comprises at least one member selected from the group consisting of polyolefin, polystyrene and polyurethane; more preferably, at least one member selected from the group consisting of polyethylene homopolymer, polyethylene copolymer, polypropylene homopolymer, polypropylene copolymer, polybutene homopolymer, polybutene copolymer; even more preferably, at least one member selected from the group consisting of ethylene/alpha-olefin copolymer, ethylene/unsaturated ester copolymer, and ethylene/unsaturated acid copolymer. Still more preferably, the second layer comprises ethylene-vinyl acetate copolymer. A preferred ethylene/vinyl acetate copolymer comprises from about 3 to about 28% vinyl acetate comonomer, more preferably, from about 5 to about 20% vinyl acetate comonomer, even more preferably, from about 8 to about 18% vinyl acetate copolymer and even yet still more preferably, from about 12 to about 18% vinyl acetate comonomer.

The second layer can further comprise additional polymer in an amount of from about 5 to about 80% based on layer weight, more preferably from about 10 to about 40% and even more preferably from about 10 to about 20%. Preferred additional polymers include at least one member selected from the group consisting of polyolefin, polystyrene, polyamide, polyester, polymerized ethylene vinyl alcohol, polyvinylidene chloride, polyether, polyurethane, polycarbonate, and starch-containing polymer; more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer. The second layer facilitates the orientation process used to produce the film of the invention.

The polymer of the second layer preferably has a melt index of from about 0.3 to about 50, more preferably from about 1 to about 20, still more preferably from about 1 to about 10, even more preferably from about 1 to about 5, and, still more preferably from about 1 to about 3.

Preferably, the second layer has a thickness of from about 0.05 to about 4 mils; more preferably, from about 0.1 to about 1 mil; and, still more preferably, from about 0.2 to about 0.7 mils. Preferably, the thickness of the second layer is from about 1 to about 50 percent, based on total film thickness; more preferably, from about 5 to about 50 percent; still more preferably, from about 10 to about 50 percent; still more preferably, from about 13 to about 45 percent; yet still more preferably, from about 15 to about 40 percent; and even yet still more preferably, from about 17 to about 35 percent; still more preferably, from about 8 to about 25 percent; still more preferably, from about 20 to about 25 percent. Preferably, the thickness of the second layer is at least 50% of the thickness of the third layer, more preferably, at least 75% of the thickness of the third layer, more preferably, at least 100% of the thickness of the third layer, more preferably, at least 125% of the thickness of the third layer and even more preferably, at least 150% of the thickness of the third layer.

The third layer comprises a polyamide having a melting point within the temperature range of 160° C. and below, and preferably less than 160° C. Preferably, the third layer comprises a polyamide having a melting point within the temperature range of 160° C. and below; still more preferably, from about 120° C. up to 160° C.; still more preferably, from about 120° C. up to 155° C.; yet still more preferably, from about 120° C. up to 150° C.; even yet still more preferably, from about 120° C. up to 145° C.; and even still more preferably, from about 120° C. up to 140° C. Preferably, the polyamide is a copolyamide having a crystallinity of less than about 30%; more preferably, less than about 25%; even more preferably, less than about 20%; and still more preferably, less than about 15%. Preferably, the polyamide comprises mer units derived from laurylactam, caprolactam, hexamethylene diamine, isophthalic acid, terephthalic acid, dodecanoic acid, sebacic acid, metaxylenediamine; more preferably from the group consisting of copolyamide 6/12, copolyamide 6/9, copolyamide 6/69, copolyamide 66/69/6I, copolyamide 66/610/6I, copolyamide 66/69/MXD6 and copolyamide 66/610/MXD6.

In one preferred embodiment, the polyamide in the third layer comprises at least one member selected from the group consisting of: (a) copolyamide 6/12 comprising (i) caprolactam mer in an amount of from about 20 to about 80 weight percent, and (ii) laurylactam mer in an amount of from about 80 to about 20 weight percent; (b) copolyamide 66/69/6I comprising from about 10 to about 50 weight percent hexamethylene adipamide mer (more preferably, from about 20 to about 40 weight percent); about 10 to about 50 weight percent polyamide 69 mer (more preferably, from about 20 to about 40 weight percent); and, from about 10 to about 60 weight percent hexamethylene isophthalamide mer (more preferably, from about 10 to about 40 weight percent).

The use of a polyamide with a melting point of 160° C. and below provides certain unexpected results when compared to the use of polyamides with melting points greater than 160° C. It has been discovered that in the multilayer film of the invention, the use of an inner layer comprising a polyamide with a melting point of 160° C. and below, in conjunction with an outer layer comprising polyester: enables the film to be oriented to a higher degree than would otherwise be permitted; produces a film with a higher level of free shrink; and, provides superior optical clarity, relative to films having an inner layer comprising a polyamide with a melting point of greater than 160° C. Furthermore, it has also been discovered that it is easier to orient a tape to produce the film of the invention, relative to film having an outer polyester layer and an inner layer of polyamide having a melting point of greater than 160° C. The ease of orientability and wider orientation window provided the films of this invention also result in a more stable orientation process. Additionally, the films of this invention can also be oriented at a lower temperature than films comprising an inner layer comprising a polyamide with a melting point greater than 160° C. While the composition of the films of this invention also provide higher free shrink, the process of orientation at a lower temperature also enhances the free shrink of the multilayer films of this invention. Furthermore, the films of this invention are also (8) relatively free of optical defects (such as die-lines), versus films comprising an outer polyester layer and an inner layer comprising a polyamide with a melting point greater than 160° C.

Furthermore, it has been discovered that the use of a polyamide with a melting point of 160° C. and below facilitates the incorporation and orientation of thicker layers of polyamide, thereby providing superior impact strength. It is difficult to orient layers comprising polyamide with a melting point greater than about 160° C. if the thickness of the layer is greater than about 15%, and even more difficult if the thickness is greater than 20%, of the thickness of the multilayer film. The thicker layer of polyamide not only provides superior impact strength but also improves the $O_2$-barrier of the film.

Preferably, the third layer has a thickness of from about 5 to about 40 percent, based on the total thickness of the multilayer film; more preferably, from about 7 to about 30 percent; still more preferably, from about 10 to about 28 percent; yet still more preferably, from about 12 to 26 percent; more preferably, from about 18 to about 25 percent. If the thickness of the third layer is less than about 5% of the total thickness of the multilayer film, the film exhibits a less-than-preferred impact strength, toughness and -puncture resistance. On the other hand, if the thickness of the third layer is greater than about 40% of the total thickness of the multilayer film, the film has a shrink and clarity which are less-than-preferred; moreover, the tape, from which the film is produced, becomes more difficult to orient if the thickness of the third layer is greater than about 40% of the total film thickness. Preferably, the third layer has a thickness of from about 0.05 to about 2 mils; more preferably, from about 0.1 to about 1 mil; still more preferably, from about 0.2 to about 0.8 mil; yet still more preferably, from about 0.2 to about 0.4 mil; and, even yet still more preferably, from about 0.2 to about 0.3 mil.

The fourth layer comprises polyester. Preferably, the polyester has a melting point of from about 130° C. to about 260° C.; more preferably, from about 150° C. to about 250° C.; even more preferably from about 170° C. to about 250° C.; still more preferably, from about 180° C. to about 240° C.; still more preferably, from about 190° C. to about 240° C.; still more preferably, from about 200° C. to about 240° C.; and, yet still more preferably, from about 210° C. to about 235° C. For applications requiring stack sealability, a higher melting point polyester is preferred. Preferably, the higher melting point polyester comprises polyester having a terephthalic acid mer content of at least 80 mole percent; more preferably, at least 90 mole percent; still more preferably, at least 95 mole percent. In another preferred embodiment, the polyester in the fourth layer is an amorpohous polyester.

While the polyester utilized in the fourth layer could be a homopolymer or a copolymer, preferably, the polyester is a copolyester. Preferably, the polyester comprises from about 70 to about 95 mole percent terephthalate mer units; more preferably, from about 80 to about 95 mole percent terephthalate mer units; and still more preferably, from about 85 to about 90 mole percent terephthalate mer units. For applications requiring overlap sealability, a polyester having a higher mole percent of terephthalate mer units are preferred. Examples of suitable polyester include PET homopolymer, PET copolymer, PEN homopolymer, and PEN copolymer.

Preferably, the fourth layer has a thickness of from about 0.05 to about 4 mils; more preferably, from about 0.1 to about 1 mil; and, still more preferably, from about 0.2 to about 0.8 mils. Preferably, the thickness of the fourth layer is from about 1 to about 40 percent of the total thickness of the multilayer film; more preferably, from about 4 to about 30 percent; still more preferably, from about 4 to about 25 percent; still more preferably, from about 5 to about 20 percent; and, still more preferably, from about 7 to about 16 percent.

Preferably, the film according to the present invention further comprises a fifth layer which has $O_2$-barrier characteristics. Preferably, the fifth layer has a thickness of from about 0.05 to about 2 mils; more preferably, from about 0.05 to about 0.5 mil; yet still more preferably, from about 0.1 to about 0.3 mil; and even yet still more preferably, from about 0.12 to about 0.17 mils. Preferably, the fifth layer comprises at least one member selected from the group consisting of EVOH, PVDC, polyalkylene carbonate, polyamide, and polyethylene naphthalate; more preferably, EVOH having about 44 mole percent ethylene mer. Preferably, the thickness of the fifth layer is from about 1 to about 25 percent of the total thickness of the multilayer film; more preferably, about 3 to about 18 percent; and, still more preferably, from about 5 to about 15 percent.

Preferably, the film further comprises a sixth layer which preferably has a composition similar to, or identical with, the composition of the third layer, as described above. Alternatively or additionally, the sixth layer comprises polyester. Preferably, the polyester has a composition similar to, or identical with, the composition of the fourth layer.

Preferably, the film further comprises a seventh layer, and more preferably, an eighth layer. The seventh layer and the eighth layer preferably serve as tie-layers. The thickness and composition of tie layers used in the films of this invention are set forth above, and also are as known to those of skill in the art.

Preferably, the film exhibits a modulus of at least 40,000 psi (more preferably, from about 40,000 to about 250,000 psi); more preferably, at least about 50,000: more preferably, at least about 60,000: more preferably, at least about 70,000; more preferably, at least about 80,000; more preferably, at least about 90,000; more preferably, at least about 100,000; more preferably, at least about 110,000, and more preferably, at least about 120,000 psi. Modulus is measured in accordance with ASTM D 882, the entirety of which is hereby incorporated by reference thereto.

Preferably, the film exhibits a shrink tension in at least one direction of at least 100 psi, more preferably 175 psi; still more preferably, from about 175 to about 500 psi; still more preferably, from about 200 to about 500 psi; more preferably, from about 225 to about 500 psi; more preferably, from about 250 to about 500 psi; more preferably, from about 275 to about 500 psi; more preferably, from about 300 to about 500 psi; and more preferably, from about 325 to about 500 psi. Shrink tension is measured in accordance with ASTM D 2838, the entirety of which is hereby incorporated by reference thereto.

Various combinations of layers can be used in the formation of the multilayer films according to the invention. Only 4-, 5-, and 6-layer preferred embodiments are provided here as illustrations. The multilayer films of the invention can also comprise more layers. Thus, modifications and variations may be utilized without departing from the principles and scope of the invention, as those skilled in the art will readily understand. Given below are some examples of preferred combinations in which the alphabetical symbols used designate the following resin layers: "A" represents a layer comprising polyolefin, preferably as described in the description of the first layer; "B" represents a layer comprising at least one member selected from the group consisting of polyolefin, polystyrene, and polyurethane, preferably as described in the description of the second layer; "C" represents a layer comprising polyamide with a melting point of 160° C. and below, preferably as described in the description of the third layer; and, "D" represents a layer comprising polyester, preferably as described in the description of the fourth layer.

Various preferred multilayer films can be prepared in accordance with the film and process of the present invention, as follows: A/B/C/D, A/C/B/D, A/B/C/E/D, A/B/E/C/D, A/C/B/E/D, A/C/E/B/D, A/E/B/C/D, A/E/C/B/D, A/C/B/C/D, A/B/C/B/D, A/B/C/E/B/D, A/B/C/E/C/D, A/B/E/C/B/D, A/C/E/C/B/D, A/B/C/B/B'/D, A/C/B/B'/B"/D, A/C/B/C/B/D, A/C/E/B/B'/D. In any one of these multilayer structures, a plurality of layers (A), (B), and (C) may be formed of the same or different modified compositions.

Preferably, the film is produced by casting an annular tape which is thereafter oriented at least 2.7:1 in at least 1 direction; more preferably, from about 2.7:1 to about 10:1 in at least one direction; still more preferably, at least 2.8:1; still more preferably, at least 2.9:1, yet still more preferably, at least 3.0:1; even yet still more preferably, at least 3.1:1; yet still more preferably, at least 3.2:1; yet still more preferably, at least 3.3:1; yet still more preferably, at least 3.4:1; yet still more preferably, at least 3.5:1; yet still more preferably, at least 3.6:1; and, yet still more preferably, at least 3.7:1. A cast multilayer tape comprising polyamide with a melting point greater than 160° C. in the inner layer, and polyester in the outer layer, is difficult to orient at a ratio of about 2.7 to 1 in the transverse direction; above 3.0 orientation becomes even more difficult. However, the films of this invention can be easily oriented at least 3:1 in at least one direction.

FIG. 1 illustrates a schematic view of a first preferred process for making films according to the present invention. As illustrated in FIG. 1, solid polymer beads (not illustrated) are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in tubing 32 which is preferably about 10 to 20 mils thick.

After cooling or quenching by water spray from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Preferably, tubing 32 is irradiated to a level of from about 40 kGy to about 120 kGy.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Furthermore, irradiated tubing 46 is inflated only enough to provide a substantially circular tubing without significant transverse orientation, i.e., without stretching.

Slightly inflated, irradiated tubing 46 is passed through vacuum chamber 54, and thereafter forwarded through coating die 56. Annular coating stream 58 is melt extruded from coating die 56 and coated onto slightly inflated, irradiated tube 50, to form two-ply tubular film 60. Coating stream 58 preferably comprises an $O_2$-barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 60 is wound up onto windup roll 62. Thereafter, windup roll 62 is removed and installed as unwind roll 64, on a second stage in the process of making the tubing film as ultimately desired. Two-ply tubular film 60, from unwind roll 64, is unwound and passed over guide roll 66, after which two-ply tubular film 60 passes into hot water bath tank 68 containing hot water 70. The now collapsed, irradiated, coated tubular film 60 is immersed in hot water 70 (preferably, having temperature of about 185° F. to 210° F.) for a period of from about 10 to about 100 seconds, i.e., for a time period in order to bring the film up to the desired temperature for biaxial orientation.

Thereafter, irradiated tubular film 60 is directed through nip rolls 72, and bubble 74 is blown, thereby transversely stretching tubular film 60. Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially-oriented blown tubing film 78 is produced, this blown tubing preferably having been both stretched in a ratio of from about 1:1.5 to about 1:6, and drawn at a ratio of from about 1:1.5 to about 1:6; more preferably, the stretching and drawing are each performed a ratio of from about 1:2 to about 1:4. The result is a biaxial orientation of from about 1:2.25 to about 1:36, more preferably, from about 1:4 to about 1:16. While bubble 74 is maintained between pinch rolls 72 and 76, blown tubing 78 is collapsed by rollers 80, and thereafter conveyed through pinch rolls 76 and across guide roll 82, and then rolled onto wind-up roll 84. Idler roll 86 assures a good wind-up.

Figure 2:
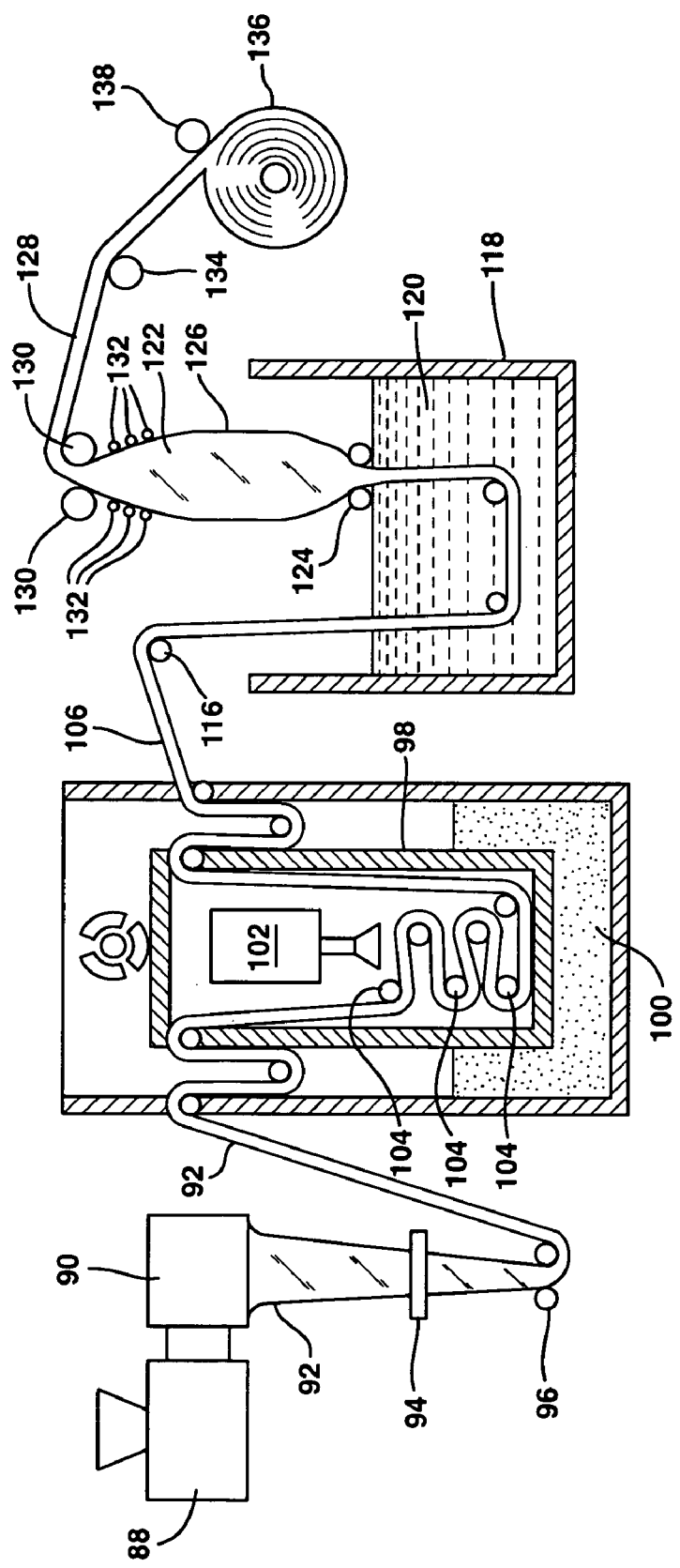
FIG. 2 illustrates a schematic view of a second preferred process for making a multilayer film in accordance with the present invention.

FIG. 2 illustrates a schematic of a second preferred process for making a film in accordance with the present invention. In FIG. 2, solid polymer beads (not illustrated) are fed to a plurality of extruders (for simplicity, only extruder 88 is illustrated). Inside extruders 88, the polymer beads are forwarded, melted, and degassed, following which the resulting bubble-free melt is forwarded into die head 90, and extruded through an annular die, resulting in tubing tape 92 which is preferably from about 10 to 20 mils thick, and preferably has a lay-flat width of from about 2 to 10 inches.

After cooling or quenching by water spray from cooling ring 94, tubing tape 92 is collapsed by pinch rolls 96, and is thereafter fed through irradiation vault 98 surrounded by shielding 100, where tubing 92 is irradiated with high energy electrons (i.e., ionizing radiation) from iron core transformer accelerator 102. Tubing 92 is guided through irradiation vault 98 on rolls 104. Preferably, tubing 92 is irradiated to a level of from about 40 to about 120 kGy, resulting in irradiated tubing 106, which is then passed over guide roll 116, after which irradiated tubing 106 is passed into and through hot water bath tank 118 containing hot water 120. Irradiated tubing 106 is immersed in hot water 120 (preferably having a temperature of about 185 to about 210° F.) for a period of about 10 to about 100 seconds, i.e., for a time period long enough to bring the film up to the desired temperature for biaxial orientation. Thereafter, the resulting hot, irradiated tubing 122 is directed through nip rolls 124, and bubble 126 is blown, thereby transversely stretching hot, irradiated tubular tubing 122 so that an oriented film tube 128 is formed. Furthermore, while being blown, i.e., transversely stretched, nip rolls 130 have a surface speed higher than the surface speed of nip rolls 124, thereby resulting in longitudinal orientation. As a result of the transverse stretching and longitudinal drawing, oriented film tube 128 is produced, this blown tubing preferably having been both stretched at a ratio of from about 1:1.5 to about 1:6, and drawn at a ratio of from about 1:1.5 to about 1:6. More preferably, the stretching and drawing are each performed at a ratio of from about 1:2 to about 1:4. The result is a biaxial orientation of from about 1:2.25 to about 1:36, more preferably, from about 1:4 to about 1:16. While bubble 126 is maintained between pinch rolls 124 and 130, oriented film tube 128 is collapsed by rollers 132, and thereafter conveyed through pinch rolls 130 and across guide roll 134, and then rolled onto wind-up roll 136. Idler roll 138 assures a good wind-up. This process can be carried out continuously in a single operation, or intermittently, e.g., as a two-stage process, in which the extruded, irradiated tape is wound up after irradiation, and, after a period of storage, unwound and subjected to heating and orienting in order to arrive at oriented film tubing 128.

Figure 5:
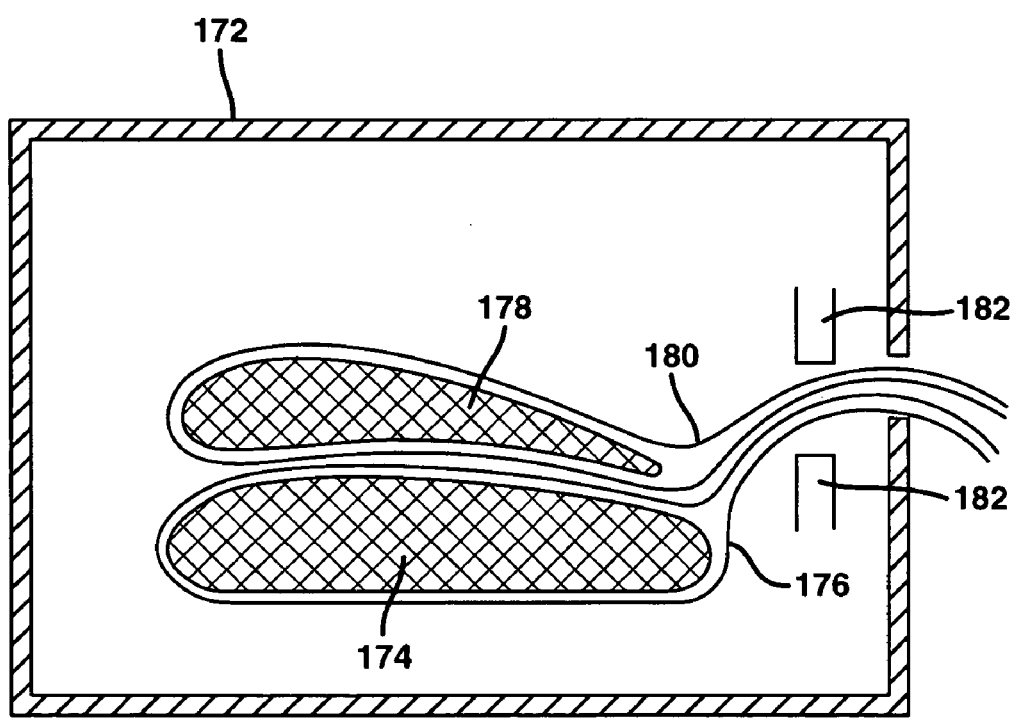
FIG. 5 illustrates a schematic of a stack sealing process.

FIG. 5 is a schematic illustration of a stack sealing process in which vacuum chamber 172 holds first product 174 which has been placed in first bag 176 and second product 178 which has been placed in second bag 180, with the resulting bagged products being stacked on top of one another, with excess bag length of each of first bag 176 and second bag 178 positioned on top of one another and within sealing distance of a means for sealing 182, ready for subsequent evacuation and sealing.

The invention is illustrated by the following examples, which are provided for the purpose of representation, and are not to be construed as limiting the scope of the invention. Unless stated otherwise, all percentages, parts, etc. are by weight.

Film No. 1

A preferred eight-layer, heat-shrinkable multilayer film according to the present invention was produced in a manner as illustrated in FIG. 2, described above. Identifying the layers from the inside out, designating the layers as first through eighth, in consecutive order, the layers were as follows: the first layer, which was an outer layer and which served as a seal layer and as an inside bag layer and product-contact layer; the second layer, which contained EVA; the seventh layer, which served as a tie layer; the third layer, which comprised polyamide having a melting point of 160° C. and below; the fifth layer, which served as an O2-barrier layer; the sixth layer, which comprised polyamide having a melting point of 160° C. and below; the eighth layer, which served as a tie layer; and, the fourth layer, which was an outer layer which served as a heat-resistant layer, abuse layer, and optics-enhancing layer.

A preferred embodiment of multilayer film had a physical structure, in terms of number of layers, layer thickness, layer arrangement, and specific chemical composition in terms of the various polymers etc. present in each of the layers, as set forth in Table I, below. This film is herein designated "Film No. 1", and was an example of a multilayer film according to the present invention. Film No. 1 had a total thickness of 1.4 mils.

TABLE I (Characteristics of Film No. 1)

| Layer Designation | Layer Chemical Identity | Layer Thickness (mils) |
|---|---|---|
| first | 80% homogeneous ethylene/alpha-olefin copolymer; and 20% LLDPE | 0.35 |
| second | EVA | 0.29 |
| seventh | modified EMA | 0.11 |
| third | Polyamide #1 | 0.15 |
| fifth | EVOH | 0.12 |
| sixth | Polyamide #1 | 0.15 |
| eighth | modified EMA | 0.13 |
| fourth | Polyester #1 | 0.10 |

The layer arrangement was in the order of Table 1, above. The resins identified in the table were as follows:

Homogeneous ethylene/alpha-olefin copolymer was AFFINITY® DPL 1280 long chain branched substantially linear single site catalyzed ethylene/octene copolymer containing 13 weight percent octene mer and having a density of 0.900 g/cc and a melt index of 6.0 grams/min. This resin was obtained from The Dow Chemical Company, of Midland, Michigan.

LLDPE was ESCORENE® LL3003.32 linear low density polyethylene having 90 weight percent ethylene mer 10 weight percent hexene mer, having a density of 0.9175 g/cc and a melt index of 3.2 g/min. This resin was obtained from Exxon Chemical Americas, of Houston, Tex.

EVA was PE 5269T ethylene/vinyl acetate copolymer having a vinyl acetate content of 6.5 percent, a melt index of 0.5 g/min, and a density of 0.9315 g/cc. This resin was obtained from the Chevron Chemical Company, of Houston, Tex.

Modified EMA was BYNEL® 2174 anhydride grafted ethylene/methyl acrylate copolymer having a melt index of 2.8 and a density of 0.931 g/cc. This resin was obtained from the Dupont Company, of Wilmington, Del.

Polyamide #1 was GRILON® CF6S caprolactam/laurylactam copolyamide, having a density of 1.05 g/cc and a melting point of 135° C. This resin was obtained from EMS-American Grilon Inc., of Sumter, S.C.

EVOH was EVAL® LC-E105A ethylene/vinyl alcohol copolymer, and contained 44 mole percent ethylene and had a melting point of 166.5° C. This resin was obtained from Eval of America, of Lisle, Illinois.

Polyester #1 was SELAR® PT 8307 modified polyester copolymer resin, and had a melting point of 220° C. (as measured by differential scanning calorimetry, according to ASTM 3410), a density of 1.33 g/cc (as measured by differential scanning calorimetry, according to ASTM D1505), and an intrinsic viscosity of 0.71 (measured by the DuPont method). This resin was obtained from the Dupont Company, of Wilmington, Del.

Film No. 1 had a total free shrink at 185° F., of 74 percent, and an impact strength (at peak load) of 94 Newtons (N), a gloss of 74% and a haze of 5.5%. Film No. 1 was especially suited to making a bag with the first layer as the inside layer and the eighth layer as the outside layer. Such bags made from Film No. 1 can be stacked on top of one another and simultaneously sealed by a single sealing means, and thereafter further processed, without sticking to one another.

Film No. 2

Film No. 2, which was another preferred eight layer, heat-shrinkable multilayer film according to the present invention, was also produced in the same general manner Film No. 1 was produced. Each of the eight layers of Film No. 2 corresponded in location, function, relative layer thickness, and chemical composition to Film No. 1. However, the fourth layer, instead of comprising Polyester #1, instead comprised Polyester #2, which was Hipertuf™ 89010 2,6-dimethyl naphthalate based copolymer polyethylene naphthalate (PEN) resin, which had an intrinsic viscosity of 0.855 (method R-103). This polyester resin was obtained from the Shell Chemical Company, of Apple Grove, W. Va. However, Film No. 2 had a total thickness of 1.9 mils. Film No. 2 also had a peak load impact strength of 133 N, a total free shrink at 185° F. of 75 percent, a gloss of 78 percent, and a haze of 4.0 percent.

TABLE 2

(Characteristics of Film No. 2)

| Layer Designation | Layer Chemical Identity | Layer Thickness (mils) |
|---|---|---|
| first | 80% homogeneous ethylene/alpha-olefin copolymer, and 20% LLDPE | 0.48 |
| second | EVA | 0.40 |
| seventh | modified EMA | 0.15 |
| third | Polyamide #1 | 0.21 |
| fifth | EVOH | 0.15 |
| sixth | Polyamide #1 | 0.21 |
| eighth | modified EMA | 0.17 |
| fourth | Polyester #1 | 0.13 |

The layer arrangement was in the order of Table 2, above. The resins specified in Table 2 were as identified above, i.e., below Table 1.

Film No. 3

Film No. 3, which was another preferred eight-layer, heat-shrinkable multilayer film according to the present invention, was also produced in the manner schematically illustrated in FIG. 1. Table 3, below, sets forth the physical structure, in terms of number of layers, layer thickness, layer arrangement, and specific chemical composition in terms of the various polymers, etc. present in each of the layers of Film No. 3. Film No. 3 had a total thickness of 1.9 mils (13.5 mils in the tape before orientation), a total free shrink at 185° F. of 72 percent, an impact strength of 115 N, a gloss of 78 percent, and a haze of 4.8 percent.

TABLE 3

(Characteristics of Film No. 3)

| Layer Designation | Layer Chemical Identity | Layer Thickness (mils) |
|---|---|---|
| first | 80% homogeneous ethylene/alpha-olefin and 20% LLDPE | 0.46 |
| second | 80% EVA 20% HDPE | 0.29 |
| seventh | modified EMA | 0.13 |
| third | Polyamide #1 | 0.29 |
| fifth | EVOR | 0.13 |
| sixth | Polyamide #1 | 0.29 |
| eighth | modified EMA | 0.15 |
| fourth | Polyester #1 | 0.16 |

The layer arrangement was in the order of Table 3, above. The resins specified in Table 3 were as identified above, i.e., below Table 1. The only compositional difference between Film No. 3 and Film No. 1 was the composition of the second layer, which contained high density polyethylene ("HDPE"). This HDPE was Fortiflex® T60-500-199 high density polyethylene resin with a density of 0.961 g/cc and a melt index of 6.2 g/min. This resin was obtained from Solvay Polymers of Deer Park, Tex.

Film No. 4

Another multilayer film, herein referred to as Film No. 4, was produced, again by the process schematically illustrated in FIG. 2. Film No. 4 was an 8-layer film having the same layer arrangement and composition as Film No. 1. Table 4, below, sets forth the physical structure, in terms of number of layers, layer thickness, layer arrangement, and specific chemical composition in terms of the various polymers, etc., present in each of the layers of Film No. 4. The result was a film having a thickness of 1.9 mil, a peak load impact strength of 183N (compared with a peak load impact strength of only 94N for Film No. 1) and a total free shrink at 185° F. of 76 percent, which is comparable to Film No. 1. A comparison of the physical properties of Film 1 and Film 4 shows that an increase in the thickness of the polyamide layer provided an increase in the impact strength of the film, without retarding free shrink. This was an unexpected result, and is believed to be due to the incorporating of the polyamide having a melting point of 160° C. and below.

TABLE 4

(Characteristics of Film No. 4)

| Layer Designation | Layer Chemical Identity | Layer Thickness (mils) |
|---|---|---|
| first | 80% homogeneous ethylene/alpha-olefin and 20% LLDPE | 0.44 |
| second | EVA | 0.34 |
| seventh | modified EMA | 0.13 |
| third | Polyamide #1 | 0.23 |
| fifth | EVOH | 0.13 |
| sixth | Polyamide #1 | 0.34 |
| eighth | modified EMA | 0.16 |
| fourth | Polyester #1 | 0.13 |

The layer arrangement was in the order of Table 4, above. The resins specified in Table 4 were as identified above, i.e., below Table 1.

FIG. 3 is a schematic of a preferred end seal bag 140, in a lay-flat position, this bag being in accord with the present invention. Bag 140 comprises bag film 142, top edge 144 defining an open top, first bag side edge 146, second bag side edge 148, bottom edge 150, and end seal 152.

FIG. 4 illustrates a schematic of side-seal bag 160, in lay-flat view, side-seal bag 160 being an alternative bag according to the present invention. Side seal bag 160 is comprised of bag film 162, top edge 164 defining an open top, bottom edge 166, first side seal 168, and second side seal 170.

In another preferred embodiment, the multilayer film of the invention can be used as a bag or as a tubular casing, preferably a shirrable casing. Preferably, the casing is used for the packaging of food products, especially processed meat products and fresh red meat products. Among the types of meat which can be packaged in the films and packages according to the present invention are poultry, pork, beef, sausage, lamb, goat, horse, and fish. Preferably, the casing of the present invention is used in the packaging of pork, poultry, beef, and sausage products.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

All ranges within all of the above-disclosed ranges are expressly included within this specification. Moreover, layers which are adjacent or directly adhered to one another are preferably of differing chemical composition, especially differing polymeric composition. All reference to ASTM tests are to the most recent, currently approved and published version of the ASTM test identified, as of the priority filing date of this application.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A process for packaging a product, comprising the steps of:
   (A) placing a first product into a flexible, heat-shrinkable bag, the bag having an open top, whereby a first bagged product having excess bag length results, and wherein the bag comprises a multilayer film comprising:
      (1) a first layer, which is an inside bag layer, and which comprises polyolefin;
      (2) a second layer comprising at least one member selected from the group consisting of polyolefin, polystyrene, and polyurethane;
      (3) a third layer comprising a polyamide having a melting point of 160° C. and below; and
      (4) a fourth layer, which is an outside bag layer, the fourth layer comprising polyester; and
   wherein the bag is produced by sealing the first layer to itself, whereby the first layer is an inside bag layer and the fourth layer is an outside bag layer;
   (B) repeating the placing step with a second product and a second bag, whereby a second bagged product results;
   (C) stacking at least the first and second bagged products so that the excess bag length of each of the bagged products are on top of one another within a sealing distance of a means for heat-sealing;
   (D) heat-sealing the inside layer of first bag to itself in the region between the open end of the first bag and the product, and the inside layer of the second bag to itself in the region between the open end of the second bag and the product, so that the first product is completely sealed within the first bag and the second product is completely sealed with the second bag, the sealing being carried out at a temperature so that the resulting packaged products can be freely separated from one another without layer delamination.

2. The process according to claim 1, wherein the second layer has a thickness of from about 10 to about 50%, based on the thickness of the multilayer fun.

3. The process according to claim 1, further comprising a fifth layer which serves as an $O_2$-barrier layer, the fifth layer comprising at least one member selected from the group consisting of EVOH, PVDC, polyalkylene carbonate, polyamide, and polyethylene naphthalate.

4. The process according to claim 1, wherein from 2 to 5 bagged products are stacked on top of one another during heat-sealing.

5. The process according to claim 4, wherein 2 bagged products are stacked on top of one another during heat-sealing.

6. The process according to claim 1, wherein the polyamide makes up at least 40 weight percent of the third layer.

7. The process according to claim 1, wherein the film has a total free shrink, at 185° F., of from about 40 to 170 percent, and the film has a thickness uniformity of greater than about 20 percent.

8. The process according to claim 1, wherein the polyamide makes up at least 50 weight percent of the third layer.

9. The process according to claim 1, wherein the polyester comprises from about 80 to about 95 mole percent terephthalate mer units.

10. The process according to claim 1, wherein the polyamide has a melting point of from about 120° C. up to 145° C.

11. The film according to claim 1, wherein the polyolefin in the first layer has a melting point of from about 50° C. to less than 125° C.

12. The film according to claim 1, wherein the polyester has a melting point of from about 210° C. to about 235° C.

* * * * *

UNITED STATES PATENT AND TRADEMARK OFFICE
CERTIFICATE OF CORRECTION

PATENT NO. : 7,207,157 B2  Page 1 of 1
APPLICATION NO. : 09/843990
DATED : April 24, 2007
INVENTOR(S) : Wolf et al.

It is certified that error appears in the above-identified patent and that said Letters Patent is hereby corrected as shown below:

Claim 11, Column 28, line 51, "film" should be -- process --.

Claim 12, Column 28, line 54, "film" should be -- process --.

Signed and Sealed this

Twenty Second Day of April, 2008

JON W. DUDAS
*Director of the United States Patent and Trademark Office*